United States Patent
Kuhn et al.

(10) Patent No.: US 6,724,866 B2
(45) Date of Patent: Apr. 20, 2004

(54) DIALOGUE DEVICE FOR CALL SCREENING AND CLASSIFICATION

(75) Inventors: Roland Kuhn, Santa Barbara, CA (US); Matteo Contolini, Santa Barbara, CA (US); Robert C. Boman, Thousand Oaks, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/072,387

(22) Filed: Feb. 8, 2002

(65) Prior Publication Data

US 2003/0152199 A1 Aug. 14, 2003

(51) Int. Cl.[7] .......................... H04M 1/64; H04M 1/56; G10L 15/06; G10L 15/02
(52) U.S. Cl. .............................. 379/88.21; 379/142.01; 704/244; 704/231
(58) Field of Search .......................... 379/88.01, 88.02, 379/88.03; 704/7, 9, 209, 219, 231, 244, 246, 275, 270, 253, 248, 251

(56) References Cited

U.S. PATENT DOCUMENTS

| | | | |
|---|---|---|---|
| 5,724,408 A | * 3/1998 | Morganstein | 379/88.2 |
| 6,321,197 B1 | * 11/2001 | Kushner et al. | 704/270 |
| 6,327,343 B1 | * 12/2001 | Epstein et al. | 379/88.01 |
| 6,349,290 B1 | * 2/2002 | Horowitz et al. | 705/35 |
| 6,404,859 B1 | * 6/2002 | Hasan | 379/88.04 |

* cited by examiner

Primary Examiner—Fan Tsang
(74) Attorney, Agent, or Firm—Harness, Dickey & Pierce, PLC

(57) ABSTRACT

The call screener employs a telephone system interface connected between a telephone network and a telephone device of a user. The interface selectively routes calls (and refrain from routing calls) based on the results from the dialogue system. The dialogue system elicits speech from an incoming caller and causes the telephone system interface to route calls from the incoming caller based on a comparison of the elicited speech with a set of stored speaker models. The stored speaker models may be maintained automatically by the system, using either a passive mode, in which calls exceeding a predetermined duration are assumed to be "acceptable" callers; and a proactive mode in which the system prompts the user at the end of the call to elect whether to save the speech models developed during that call in the acceptable user database. If desired, the user can attach other attributes or special tags to the stored models, indicating special handling or call routing rules to be applied when that caller calls again.

26 Claims, 2 Drawing Sheets

DIALOGUE DEVICE FOR CALL SCREENING AND CLASSIFICATION

BACKGROUND OF THE INVENTION

The present invention relates generally to telephone call screening. More particularly, the invention relates to a call screening system and method that uses speaker verification and/or speech recognition to ascertain the identity of a caller and thereafter handle the incoming call in a predetermined way based on the system user's desires or usage profile.

Many people use caller ID to screen incoming calls. That is, they look at a screen display giving the identity of the caller—if the caller's number is not blocked—before deciding whether to pick up the telephone or not. However, a high proportion of telephone numbers in North America is blocked, and in any case, a familiar caller may be calling from an unfamiliar number. In such case the familiar caller might be inadvertently rejected by the user.

There have been a number of proposed solutions to the problem, however each has proven deficient in certain important respects. One existing system is provided as a call screening service, typically a service that the user subscribes to at additional cost, in conjunction with the caller ID service. With this screening service, if the caller's number is blocked, the system intercepts the call prior to ringing the user's telephone. The caller is then prompted to state his or her name, or company affiliation, which are recorded as audio information, whereupon the call is then allowed to ring through to the user regardless of what the caller says. When the user answers the incoming call, rather than being immediately connected to the caller, the user is placed in communication with the call screening server. The server replays a prerecorded announcement that the incoming call was intercepted and then replays how the caller responded to the prompt for the caller's name or company affiliation. The user then has the option to either (1) accept the incoming call, (2) reject the incoming call with a message to the caller that the call is refused or (3) reject the call with a message to the caller asking that the user be placed on the caller's "do not call" list.

While the aforementioned call screening system does give the user a means to avoid talking to unwanted callers, it still requires the user to pick up the telephone, listen to the call screening server's message containing the incoming caller's name or company affiliation and select one of the three call handling options. Thus, while this call screening system can eliminate the need to talk to unwanted callers, it does not insulate the user from having a tranquil evening spoiled by numerous calls by telemarketers. Although the user can select the parties with whom to speak, the telephone still rings.

Another proposed solution is the telemarketing call "zapper" that screens out calls that are placed using predictive dialer computers. Some telemarketers will use predictive dialer computers to rapidly place calls, allowing them to spend time only on those calls where the party actually answers. The zapper emits a special tone that fools the dialing computer into thinking that the called number is disconnected or no longer in service. When the computer hears this tone it hangs up before the telemarketer is able to connect with the called party's phone and the computer deletes the called party's phone number from its database. In theory, over time, as the zapper-protected number is removed from more and more databases, the user experiences fewer and fewer telemarketing calls.

While interesting in theory, unfortunately, the zapper does not fully solve the call screening problem, because calls that are placed without use of predictive dialing computers or auto-dialer systems are not intercepted by the zapper.

The present invention affords considerable more functionality than either of the aforementioned call screening solutions. The present invention uses speaker verification and speaker recognition technology to construct an acceptable caller list, which is then used to screen incoming callers. In the presently preferred embodiment, when the user first signs up for the screening service based on the invention (or purchases a physical device in which the invention is incorporated), the system begins constructing speaker voice models for each of the people with whom the user carries out conversations of reasonable length. After each telephone call, the system will ask the user whether or not to enter the other person's voice profile and telephone number (if unblocked) in the acceptable caller list. It may also prompt the user for the other person's name.

Subsequently, if a person on the acceptable caller list calls the user back from the same unblocked number, the call will be put through immediately (as in the existing technology). On the other hand, if an acceptable caller calls from a blocked number or from a new number, the system will ask the caller for his or her name, and/or for other information. If the voice profile (possibly together with the name) matches the profile for someone on the acceptable caller list, the call will be put through; otherwise a message may be taken by routing the call to a suitable answering machine or voicemail system.

The invention can be implemented as either a server-based system or as a locally deployed hardware or software system associated with the user's telephone equipment. The invention is also capable of being extended to more complex versions of the basic idea, in which there are several classes of callers and different actions to be taken for each. For instance, some callers might be subjected to a detailed series of questions by the system, with the resulting action determined by their recognized response. Also, the system can be configured to take other action based on who the caller is, or what the caller says. For example, the system can be configured so that the telephone system interface selectively communicates a message over a computer network, such as the internet.

As will be more fully explained herein, the invention offers a number of advantages over prior call screening systems. Calls from telemarketers and other unwelcome callers may be handled automatically by the system, based on rules established by the user. The invention allows the recipient of telephone calls to determine exactly how each class of call is to be handled, depending on the identity of the caller. Compared with existing systems, the invention has the advantage that calls from unwelcome people (e.g., telemarketers) do not consume any of the recipient's time. For familiar, welcome callers using a blocked or unfamiliar number, the system imposes only a very slight delay (the time required for them to identify themselves to the system), rather than the longer delay imposed by other conventional systems which play back the response to the user. In effect, the invention gives users the capability to "hire" an automatic secretary who will screen their calls and respond to them appropriately.

SUMMARY OF THE INVENTION

In accordance with one aspect of the invention, the call screener employs a telephone system interface having at least one port for connection to a telephone network, and at least one port for connection to the telephone device of a user. The interface is operable to selectively route calls (and refrain from routing calls) originating from the telephone network to the telephone device, or to another device, such as an answering machine or voice mail system. A dialogue system coupled to the telephone system interface elicits speech from an incoming caller and causes the telephone system interface to route calls from the incoming caller based on a comparison of the elicited speech with a set of stored speaker models.

The stored speaker models may be maintained automatically by the system, using either a passive mode, in which calls exceeding a predetermined duration are assumed to be "acceptable" callers; and a proactive mode in which the system prompts the user at the end of the call to elect whether to save the speech models developed during that call in the acceptable user database. If desired, the user can attach other attributes or special tags to the stored models, indicating special handling or call routing rules to be applied when that caller calls again.

For a more complete understanding of the invention, its objects and advantages, refer to the remaining specification and to the accompanying drawings.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
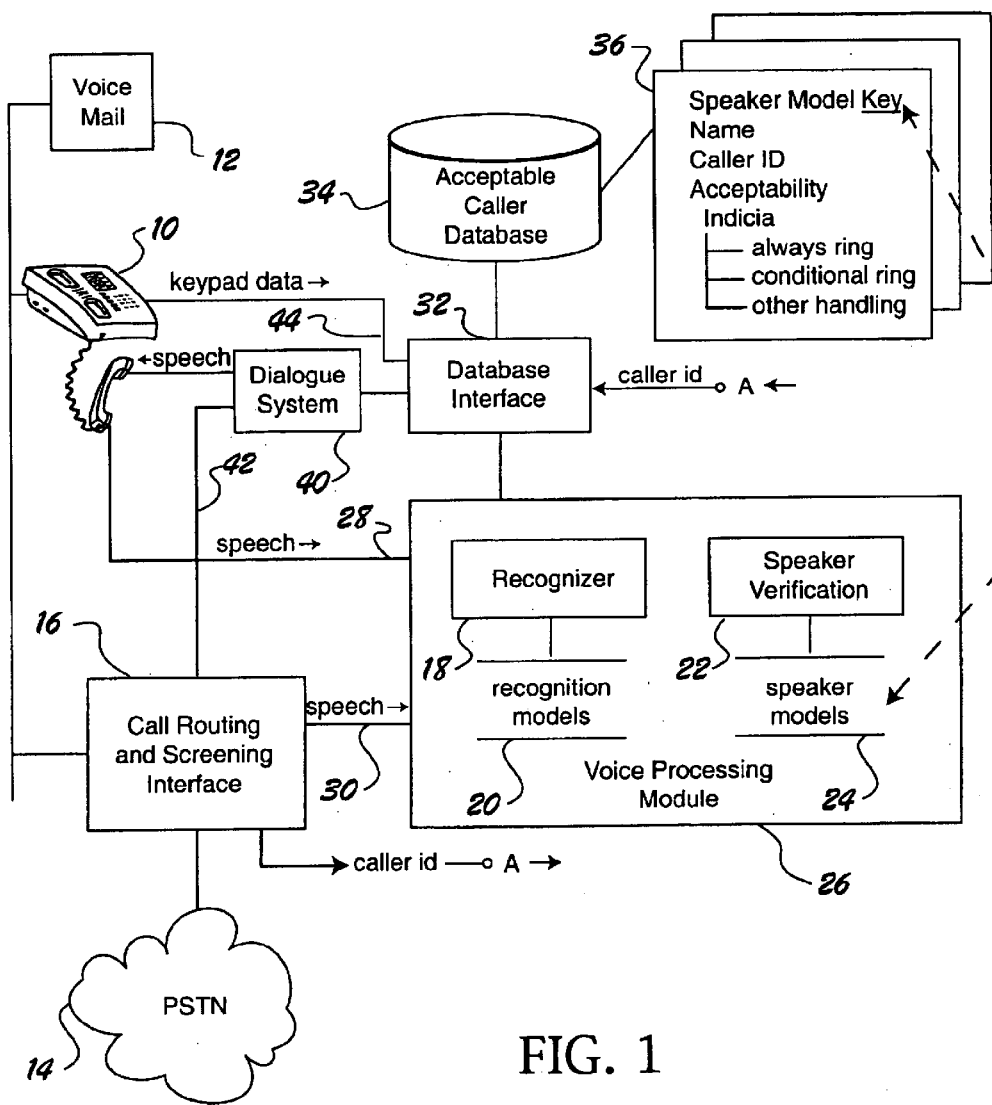
FIG. 1 is a block diagram of a presently preferred embodiment of the invention.

The following description of the preferred embodiment(s) is merely exemplary in nature and is in no way intended to limit the invention, its application, or uses.

A presently preferred embodiment of the invention will now be described in an exemplary application in which the user has a telephone 10 and a voicemail system or answering machine 12. In the illustrated embodiment the telephone 10 and voicemail system 12 may be connected to the same telephone line or extension, or they may be connected to different telephone lines or extensions. Instead of being coupled to the public switched telephone network (PSTN) 14 by direct connection, the telephone 10 and voicemail system 12 are coupled to the call routing and screening interface module 16. This module is in turn connected to the public switched telephone network 14. Thus incoming calls are intercepted by the call routing and screener interface and then passed on to the telephone 10 or voicemail system 12 based on the outcome of the call screening features of the invention.

The preferred embodiment employs a speech recognizer 18 with an associated set of speech recognition models 20, and a speaker verification system 22 with an associated set of speaker models 24. In FIG. 1 these recognizer and verification modules are illustrated as being bundled or packaged within a voice processing module 26. Preferably, the recognizer 18 and speaker verification module 22 are designed to work cooperatively. Each is able to use the services of the other, as needed to perform the respective recognition and verification functions involved in the call screening and routing process. The voice processing module is designed to receive speech data input from both the user's telephone, as on line 28 and from the call routing and screening interface 16 as on line 30. This speech data may be analog audio data, or it may be digital data. In the latter case, the digital data may be generated by the telephone 10 and by the call routing and screening interface 16. The speech data supplied to the voice processing module 26 is thus made available to both recognizer 18 and speaker verification module 22.

The voice processing module 26 is also coupled to a database system through database interface 32. The database interface 32 provides access to the acceptable caller database 34. As illustrated, the acceptable caller database maintains records, as illustrated by exemplary record 36, in which pertinent acceptable caller information is maintained. For example, the database may contain records of caller's name, caller ID, a speaker model (key linking that record with one of the speaker models 24) and an acceptability rating. The acceptability rating may be used to signify, for example, that a call from a particular caller will always be allowed to ring through, or will conditionally be allowed to ring through or will receive other handling.

The results of speech recognition (performed by recognizer 18) and/or speaker verification (performed by speaker verification module 22) serve as commands that are processed by the database interface 32. By way of illustration, if the speaker verification module 22, through access to its speaker models 24, ascertains that an incoming caller matches a speaker it has record of, a query is issued via database interface 32 to retrieve the corresponding record for that speaker using the speaker model key.

In this case, perhaps the incoming caller has been previously set up by the user as an acceptable caller who will be permitted to ring through only from 10 a.m. until 12 noon. The acceptable caller database would contain such information in the acceptability rating associated with that speaker. The system would then determine, based on time of day information maintained by the system processor, whether the incoming call should be allowed to ring through, or not.

A multipurpose dialogue system 40 connects the database interface 32 with the call routing and screening interface 16. The database interface 32 examines the acceptable caller record associated with the incoming caller, extracts the acceptability rating information and provides it to the dialogue system 40 for action. In the previous example, if the hour of the day falls between 10 a.m. and 12 noon, the dialogue system would send a switching command on line 42 to the call routing and screening interface 16. Interface 16 would, in turn, allow the incoming call from PSTN 14 to be connected to the telephone 10. If the hour of day was not within the accepted range, the call routing and screening interface 16 would block the call (or route it to the voicemail system 12 if that was the user's preprogrammed instruction).

In some applications, a user may wish to permit a caller of unknown identity to ring through, if that caller is able to supply certain prearranged or preassigned information. For example, if the user is expecting to receive a call from a rare coin vendor, in response to a previous inquiry, the user can generate a user defined record in the acceptable caller database to accommodate this. Specifically, the user would create an entry such that any caller who mentions the word "coin" or "coins" in response to a prompt would be permitted to ring through. The multipurpose dialogue system 40 is programmed to the user to ask the incoming caller to state the caller's name and purpose of the call. If the system is programmed by the user to expect certain preprogrammed message responses (such as the word coin or coins) the dialogue system 40 instructs the database interface 32 to obtain and process information from recognizer 18. Thus, if the incoming caller mentions coin or coins in response to the prompt, recognizer 18 will identify these words and make that fact known to database interface 32. This, in turn, allows the database interface to retrieve the acceptable caller record associated with those keywords.

The multipurpose dialogue system can also be used to provide dialogue services for the user. The user would typically operate the system using the telephone 10. The user would supply commands by either keypad data entry over line 44 or by using speech that would be supplied via the handset as illustrated by line 28. Keypad data on line 44 may be supplied directly to database interface 32. The dialogue system 40 provides prompts to the user on line 48.

The presently preferred system automatically builds and maintains speaker models to be used by the speaker verification module 22. These are generated by the voice processing module 26 and stored in the acceptable caller database using the procedure illustrated in FIG. 2. Two presently preferred embodiments are illustrated for constructing the speaker models. Both construct the models automatically as the user and incoming caller converse. One embodiment implements a "Passive" mode, in which the models are automatically stored for all calls of a predetermined duration. The other embodiment implements a "Proactive" mode in which the user is prompted to make the decision whether (and how) a speaker model will be stored at the end of the call.

Figure 2:
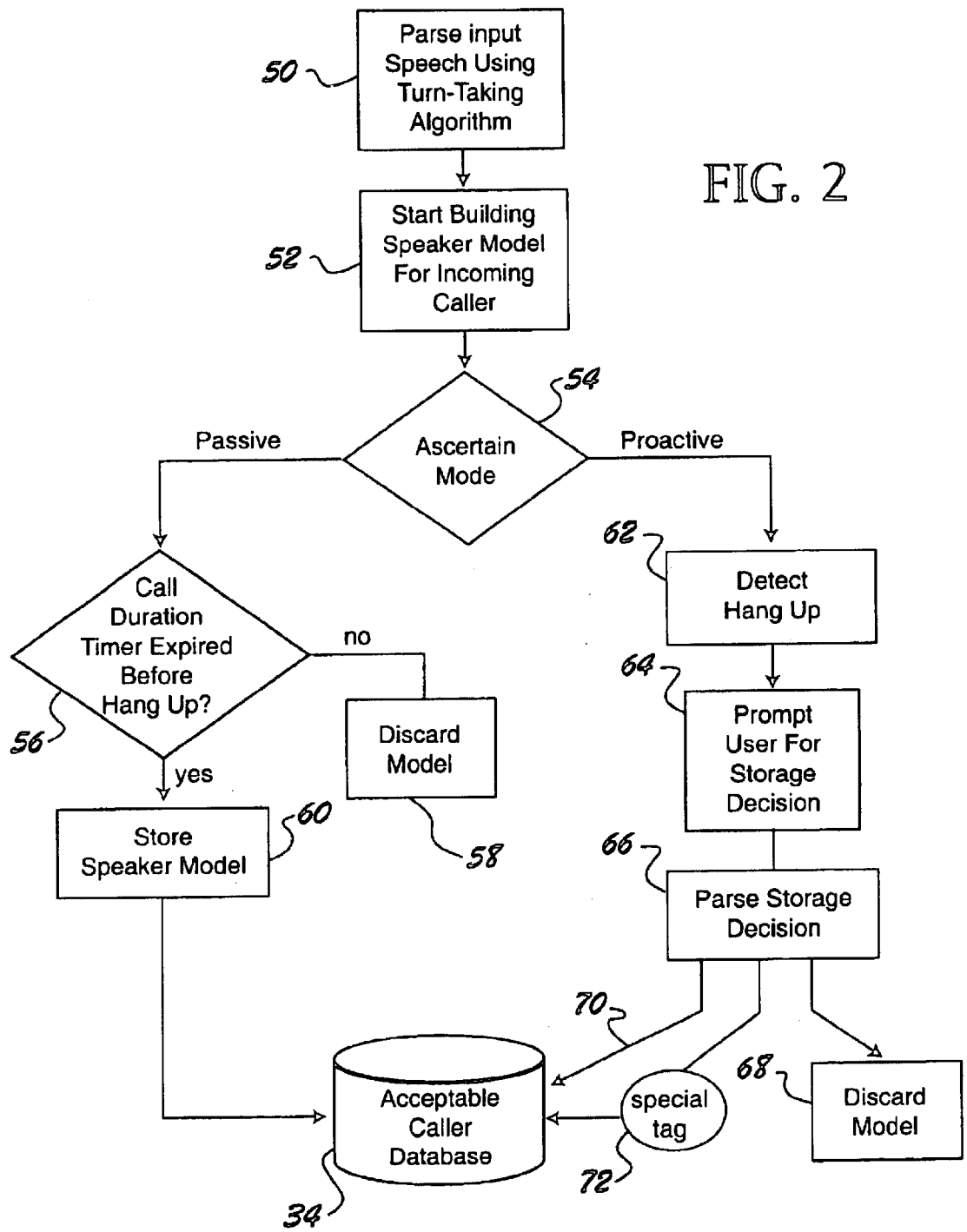
FIG. 2 is a flowchart diagram illustrating how the acceptable caller database is maintained in the presently preferred embodiment.

Referring to FIG. 2, both procedures begin at step 50, by parsing the input speech using a suitable turn-taking algorithm to separate the speech of the user (system owner) from that of the incoming caller. The speech of the user and incoming caller are separated at this stage, so that the system can begin to construct a speaker model for the incoming caller. If desired, the system can also construct a speaker model for the user (system owner), as well. Having such model would allow the user to call his or her own system from another telephone, to leave a voice mail message for a spouse, for example.

After separating the incoming caller's speech from that of the user, the system begins building a speaker model for the incoming caller at step 52. While there are many suitable ways to construct speaker models for speaker verification, one way is to construct an eigenvoice representation of the speaker by capturing speech recognition parameters and then performing dimensionality reduction. Another way to construct speaker models is to use Gaussian mixture models. For more information on the eigenvoice technique, see U.S. Pat. No. 6,141,644, to Kuhn et. al., entitled, "Method for Speaker Verification and Speaker Identification Based on Eigenvoices."

While either a passive mode implementation or a proactive mode implementation can be separately constructed, the flowchart of FIG. 2 illustrates how to implement both, giving the user a choice of which mode to use. Thus the mode of operation is determined at step 54. The left-branch describes the Passive mode and the right-branch describes the Proactive mode.

Taking the Passive mode first, the procedure maintains a call duration timer that is tested at step 56. If the predetermined time (e.g., N seconds) has elapsed, the system presumes that the incoming caller is one with whom the user will wish to speak to again. If the user terminates the call in less than the predetermined time, then the system presumes that the incoming caller is not to be deemed an "acceptable" caller in future calls. Thus the system discards the speaker model at step 58 if the predetermined time is not met; otherwise the system stores the speaker model at step 60 into the acceptable caller database 34. Of course, if desired, the system could also maintain an "unacceptable caller" database as well. If such is constructed, it would be stored at step 58. If desired, such unacceptable caller database could be implemented as part of database 34, with appropriate attribute set to indicate unacceptability.

Turning now to the Proactive mode (right-branch), the procedure waits until call termination (hang up) occurs at step 62. The system then prompts the user at step 64 for a storage decision. The user's decision may be indicated through keypad entry (via line 44, FIG. 1) or by voice, using the services of the speech recognizer 18 (FIG. 1) to decode the user's instructions. The user's filing instructions are then parsed at step 66 and the appropriate storage action is taken. As illustrated, the user may elect not to store the speech model of the last caller, in which case the system discards the model at 68. The user may elect to store the model, in which case the model may be stored as at 70 without special instruction, or with associated special handling or routing attribute or tag as at 72. The special handling tag would be set, for example, if the user wishes to limit the time to receive a call from this caller to certain hours of the day, or if the user wishes to have the dialog system 40 issue that caller with a particular prompt or message the next time he or she calls.

From the foregoing, it will be seen that the present system gives a great deal of flexibility in deciding who the user wishes to talk to and how all incoming calls should be handled. The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A call screener apparatus, comprising:

a telephone system interface having at least one port for connection to a telephone network and at least one port for connection to a telephone device of a user and being operable to selectively respond to calls originating from said telephone network to said telephone device;

a dialogue system coupled to said telephone system interface that elicits speech from an incoming caller and causes said telephone system interface to respond to a call from said incoming caller based on a comparison of said elicited speech with a set of stored speaker models, or based on content of what the incoming caller says in response to a prompt; and a speaker model maintenance system that updates said set of stored speaker models automatically as a result of a communication between said user and said incoming caller, said maintenance system operating in a passive mode to store a speaker model for said incoming caller as an acceptable caller when said communication lasts more than a predetermined length of time selected to be of sufficient length to support a presumption that the user wishes to speak to the caller again.

2. The call screener apparatus of claim 1 further comprising a database of speaker models having a database interface coupled to said dialogue system.

3. The call screener apparatus of claim 2 wherein
said database is configured to define relationships between said speaker models and an indicia of caller acceptability by which calls are selectively routed.

4. The call screener apparatus of claim 1 further comprising phone number-based caller identification module that captures a caller identification number and wherein said telephone system interface responds to a call from said incoming caller based at least in part upon said captured caller identification number.

5. The call screener apparatus of claim 1 wherein said telephone system interface selectively routes calls originating from said telephone network.

6. The call screener apparatus of claim 1 wherein said telephone system interface selectively operates a telephone device to send selected messages based on said comparison of said elicited speech with said set of stored speaker models.

7. The call screener apparatus of claim 1 wherein said telephone system interface selectively activates a device.

8. The call screener apparatus of claim 1 wherein said telephone system interface selectively communicates a message over a computer network.

9. The call screener apparatus of claim 1 wherein said set of stored speaker models includes a caller acceptability indicia associated with said models and said dialogue system causes said telephone system interface to route a call from said incoming caller based further on said caller acceptability indicia.

10. The call screener apparatus of claim 1 for use with a user telephone system having plural telephone devices, wherein said dialogue system causes said telephone system interface to selectively route a call from said incoming caller to one of said plurality of telephone devices based on said comparison of said elicited speech with a set of stored speaker models.

11. The call screener apparatus of claim 1 for use with a user telephone system having plural telephone devices, wherein said set of stored speaker models includes a caller acceptability indicia associated with said models and wherein said dialogue system causes said telephone system interface to selectively route a call from said incoming caller to one of said plurality of telephone devices based on said comparison of said elicited speech with a set of stored speaker models, and based further on said caller acceptability indicia.

12. The call screener apparatus of claim 1 further comprising a speaker model maintenance system that updates said set of stored speaker models in response to instruction from said user.

13. The call screener apparatus of claim 12 wherein said dialogue system includes a speech recognizer adapted to interpret spoken commands of said user, and wherein said spoken commands constitute at least part of said instruction from said user.

14. The call screener apparatus of claim 1 wherein said dialogue system includes a speaker verification module having a set of speaker models against which said speech of said incoming caller is compared.

15. The call screener apparatus of claim 1 wherein said dialogue system includes a speech recognizer having a user-configurable word list against which said speech of said incoming caller is compared.

16. The call screener apparatus of claim 15 wherein said telephone interface system selectively responds based on said comparison against said word list.

17. The call screener apparatus of claim 1 wherein said dialogue system employs a speech recognizer to extract data indicative of speaker identity from said elicited speech and further employs a speaker verification system to verify that said indicated speaker identity matches previously stored data corresponding to said indicated speaker.

18. The call screener apparatus of claim 17 wherein said dialogue system causes said telephone system to reject a caller for whom said extracted data indicative of speaker identity is not verified to match previously stored data corresponding to said indicated speaker.

19. A method for screening telephone calls, comprising:
intercepting an incoming call from a caller;
eliciting speech from said caller;
processing the elicited speech by comparing against a set of stored speaker models;
routing said incoming call based on results of said processing step;
constructing a speaker model by extracting information from the speech of incoming callers; and
updating automatically said set of stored speaker models in a passive mode as a result of a communication between said user and said incoming caller when said communication lasts more than a predetermined length of time selected to be of sufficient length to Support a presumption that the user wishes to speak to the caller again.

20. The method of claim 19 further comprising routing said incoming call to a telephone device if the elicited speech corresponds to one of said set of stored speaker models.

21. The method of claim 19 further comprising constructing a database of speaker models by extracting information from selected callers.

22. The method of claim 21 wherein said selected callers are identified as those with whom the user communicates for a predetermined call duration.

23. The method of claim 21 wherein said selected callers are designated by the user.

24. The method of claim 19 further comprising the user supplying at least one word against which the speech of said caller is compared.

25. The method of claim 19 further comprising prompting the caller to furnish an identity of the caller and using a database associating caller identity with said speaker models to test veracity of the furnished identity.

26. The method of claim 25 further comprising blocking the incoming call if said furnished identity does not correlate to the caller identity found in said database.

* * * * *

UNITED STATES PATENT AND TRADEMARK OFFICE
CERTIFICATE OF CORRECTION

PATENT NO. : 6,724,866 B2 Page 1 of 1
DATED : April 20, 2004
INVENTOR(S) : Roland Kuhn et al.

It is certified that error appears in the above-identified patent and that said Letters Patent is hereby corrected as shown below:

<u>Column 8,</u>
Line 37, "Support" should be -- support --.

Signed and Sealed this

Twenty-sixth Day of October, 2004

JON W. DUDAS
*Director of the United States Patent and Trademark Office*